(12) United States Patent
Sun et al.

(10) Patent No.: US 10,947,357 B2
(45) Date of Patent: *Mar. 16, 2021

(54) POLYMERIC MATERIAL FOR CONTAINER

(71) Applicant: Berry Plastics Corporation, Evansville, IN (US)

(72) Inventors: David Dezhou Sun, Evansville, IN (US); Philip A. Driskill, Newburgh, IN (US); Tony Cain, Spottsville, KY (US); Rolland Strasser, Asbury, NJ (US)

(73) Assignee: Berry Plastics Corporation, Evansville, IN (US)

( * ) Notice: Subject to any disclaimer, the term of this patent is extended or adjusted under 35 U.S.C. 154(b) by 97 days.

This patent is subject to a terminal disclaimer.

(21) Appl. No.: 16/356,423

(22) Filed: Mar. 18, 2019

(65) Prior Publication Data

US 2019/0211173 A1 Jul. 11, 2019

Related U.S. Application Data

(63) Continuation of application No. 15/239,894, filed on Aug. 18, 2016, now Pat. No. 10,266,664, which is a continuation of application No. 14/331,066, filed on Jul. 14, 2014, now Pat. No. 9,447,248.

(60) Provisional application No. 61/845,760, filed on Jul. 12, 2013, provisional application No. 61/869,830, filed on Aug. 26, 2013.

(51) Int. Cl.
*C08J 9/10* (2006.01)
*C08J 9/00* (2006.01)
*C08J 9/12* (2006.01)

(52) U.S. Cl.
CPC ............. *C08J 9/10* (2013.01); *C08J 9/0023* (2013.01); *C08J 9/0061* (2013.01); *C08J 9/0066* (2013.01); *C08J 9/122* (2013.01); *C08J 2201/03* (2013.01); *C08J 2203/04* (2013.01); *C08J 2203/06* (2013.01); *C08J 2323/06* (2013.01); *C08J 2423/06* (2013.01)

(58) Field of Classification Search
CPC ... C08J 9/10; C08J 9/0023; C08J 9/122; C08J 9/0066; C08J 9/0061; C08J 2201/03; C08J 2203/06; C08J 2423/06; C08J 2323/06; C08J 2203/04; C08J 9/06
See application file for complete search history.

(56) References Cited

U.S. PATENT DOCUMENTS

| | | | |
|---|---|---|---|
| 6,323,251 B1 * | 11/2001 | Perez | B41M 1/04 428/343 |
| 2003/0151172 A1 | 8/2003 | Floyd | |
| 2006/0100296 A1 | 5/2006 | Wilkes | |
| 2014/0228498 A1 * | 8/2014 | Prince | C08J 3/226 524/433 |
| 2014/0309320 A1 * | 10/2014 | Prince | C08J 9/0014 521/91 |
| 2014/0377512 A1 | 12/2014 | Rogers | |

FOREIGN PATENT DOCUMENTS

| | | |
|---|---|---|
| EP | 713481 A1 | 5/1996 |
| EP | 0851805 A1 | 7/1998 |
| EP | 0851805 B1 | 12/1998 |
| EP | 1040158 A1 | 10/2000 |
| EP | 1057608 A2 | 12/2000 |
| EP | 2141000 A2 | 1/2010 |
| JP | 4278340 A | 10/1992 |
| WO | 9504709 | 2/1995 |
| WO | 2012174567 A1 | 12/2012 |
| WO | 2012174568 A2 | 12/2012 |

OTHER PUBLICATIONS

Indian First Examination Report for Indian App. No. 201317001026, dated Mar. 20, 2020, 6 pages.
First Examination Report for Indian App. No. 201617005271, sent Feb. 11, 2020.
Office Action dated Jan. 6, 2020, for U.S. Appl. No. 15/902,489, 22 pages.
First Examination Report for Indiana Patent App. No. 9302/DELNP/2015 dated May 6, 2019, 7 pages.
Office Action dated Oct. 4, 2019 for U.S. Appl. No. 15/713,799, (pp. 1-5).
Chinese Office Action for Chinese App. No. 20180039581.8 sent May 31, 2019, 7 pages.
Office Action dated Jul. 15, 2019 for U.S. Appl. No. 15/902,489, (pp. 1-24).
Chinese Reexamination Notification for Chinese App. No. 201480047976.2 received on Jul. 15, 2019, 12 pages.
Office Action dated Jul. 26, 2019 for U.S. Appl. No. 16/149,351, (pp. 1-6).
Office Action dated Jul. 16, 2020 for U.S. Appl. No. 15/902,489, (pp. 1-20).
First Examination Report for Indiana App. No. 201617007243 dated Dec. 16, 2019, 6 pages.
Indian First Examination Report for Indian Patent App. No. 2016/17003143 dated Sep. 11, 2020, 5 pages.
Indian First Examination Report for Indian Patent App. No. 201617000386, dated Oct. 16, 2020, 7 pages.
Canadian Office Action for Canadian Patent App. No. 2918306 dated Oct. 30, 2020, BP-423 CA II (5723-242369), 4 pages.
Mexican Office Action for MX/a/2016/002490 dated Oct. 22, 2020, BP-423 MX II (5723-242375), 7 pages.

\* cited by examiner

*Primary Examiner* — Kara B Boyle
(74) *Attorney, Agent, or Firm* — Barnes & Thornburg LLP

(57) ABSTRACT

A formulation for producing a polymeric material including high-density polyethylene, a chemical blowing agent, and other optional components is described.

20 Claims, 1 Drawing Sheet

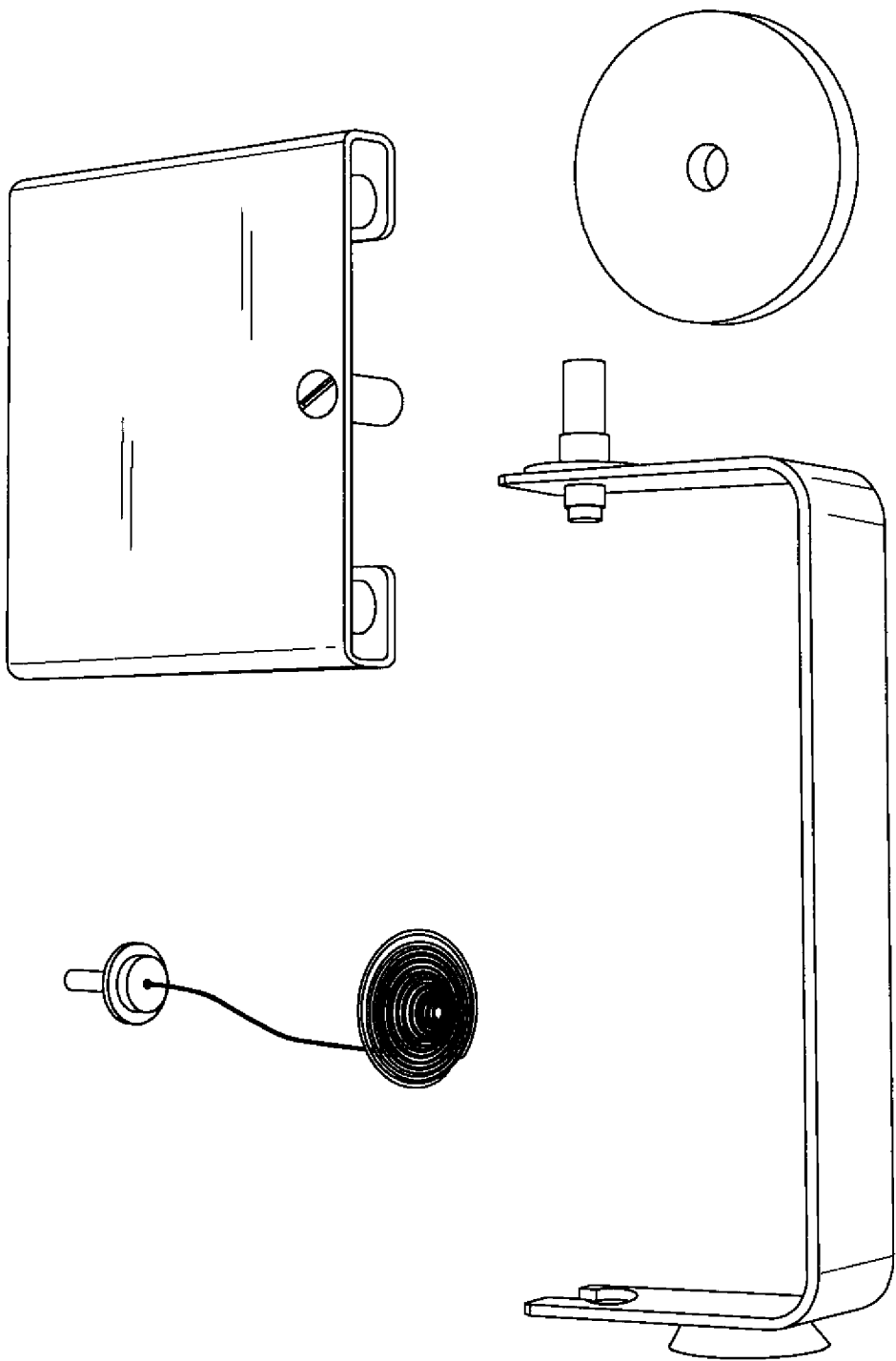

POLYMERIC MATERIAL FOR CONTAINER

PRIORITY CLAIM

This application is a continuation if U.S. application Ser. No. 15/239,894, filed Aug. 18, 2016, which is a continuation if U.S. application Ser. No. 14/331,066, filed Jul. 14, 2014, which claims priority under 35 U.S.C. § 119(e) to U.S. Provisional Application No. 61/845,760, filed Jul. 12, 2013, and U.S. Provisional Application No. 61/869,830, filed Aug. 26, 2013, each of which is expressly incorporated by reference herein.

BACKGROUND

The present disclosure relates to polymeric materials that can be formed to produce a container, and in particular, polymeric materials that insulate. More particularly, the present disclosure relates to polymer-based formulations that can produce an insulated non-aromatic polymeric material.

SUMMARY

According to the present disclosure, a polymeric material includes a polymeric resin and at least one cell-forming agent. In illustrative embodiments, a blend of polymeric resins and cell-forming agents is mixed and extruded or otherwise formed to produce an insulated non-aromatic polymeric material. The insulated non-aromatic polymeric material has a low density but is resistant to and/or can withstand impact forces. The low density, insulated, non-aromatic polymeric material provide for improved containers.

In illustrative embodiments, an insulative cellular non-aromatic polymeric material comprises a cell-forming agent and at least one high-density polyethylene-based base resin. The cell-forming agent can include a chemical nucleating agent and a physical blowing agent. In an embodiment, a base resin can be HDPE, which can be virgin HDPE, regrind, or mixtures thereof.

In illustrative embodiments, the insulative cellular non-aromatic polymeric material has a density of less than about 0.9 grams per cubic centimeter. In illustrative embodiments, the insulative cellular non-aromatic polymeric material has a density in a range of about 0.4 grams per cubic centimeter to about 0.9 grams per cubic centimeter. In illustrative embodiments, the insulative cellular non-aromatic polymeric material has a density in a range of about 0.5 grams per cubic centimeter to about 0.75 grams per cubic centimeter.

In illustrative embodiments, a polyethylene-based formulation in accordance with the present disclosure is heated and extruded to produce a tubular extrudate (in an extrusion process) that can be formed to provide a strip of insulative cellular non-aromatic polymeric material. A physical blowing agent in the form of an inert gas is introduced into a molten material before the tubular extrudate is formed. In an illustrative embodiment, a throughput system includes a multi-parison drop. For example, an extrusion line starts as a single line and then splits into 2, 3, 4, 5, or more lines for multiple parison drops. In illustrative embodiments, an insulative cellular non-aromatic polymeric material produced in accordance with the present disclosure can be formed to produce an insulative cup or container. Polyethylene resin is used to form the insulative cellular non-aromatic polymeric material in illustrative embodiments.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

FIG. 1 is a perspective view of an unassembled density determination apparatus showing the components (clockwise starting in the upper left) gem holder, platform, suspension bracket, and suspension spacer.

DETAILED DESCRIPTION

According to the present disclosure, a polymeric material is described. The polymeric material includes at least one cell-forming agent and a polymeric resin (i.e., a thermoplastic polyolefin). In illustrative embodiments, a blend of polymeric resins and cell-forming agents is mixed and extruded or otherwise formed to produce an insulated non-aromatic polymeric material. The insulated non-aromatic polymeric material has applications for forming containers (e.g., cups and bottles).

In one exemplary embodiment, a polymer-based formulation used to produce the insulative cellular non-aromatic polymeric material includes at least one polymeric resin. The polymeric material may include one or more base resins. As an example, the insulative cellular non-aromatic polymeric material comprises at least one polyethylene base resin and one or more cell-forming agents.

In one example, the base resin is high-density polyethylene (HDPE). A HDPE base resin can be a HDPE homopolymer or a HDPE copolymer. In another example, the base resin is a unimodal HDPE. In yet another example, the base resin is unimodal, high-melt strength HDPE. In still yet another example, the base resin is unimodal, high-melt strength HDPE such as DOW® DOWLEX™ IP 41 HDPE (available from The Dow Chemical Company) that has been electron-beam modified to provide long-chain branching and a melt index of about 0.25 g/10 min. Another example of a unimodal, high-melt strength HDPE is EQUISTAR® ALATHON® H5520 HDPE copolymer (available from Lyondell Chemical Company) that has been electron-beam modified to have long-chain branching and a melt index of about 0.25 g/10 min. Another example of a suitable unimodal HDPE is FORMOLENE® HB5502F HDPE hexene copolymer (available from Formosa Plastics Corporation). In another suitable embodiment of a HDPE hexene copolymer, the HDPE is Marlex® HHM 5502BN HDPE hexene copolymer (Chevron Phillips Chemical Company, The Woodlands, Tex.).

Long-chain branching refers to the presence of polymer side chains (branches) that have a length that is comparable or greater than a length of the backbone which is coupled to the polymer side chains. Long-chain branching creates viscoelastic chain entanglements (polymer entanglements) that hamper flow during extensional or oriented stretching and provide for a strain hardening phenomenon.

The strain hardening phenomenon may be observed through two analytical methods. The first analytical method used to observe the presence of strain hardening on an extensional rheometer. During extensional or oriented flow on an extensional rheometer, strain hardening will occur when polymer entanglements do not allow the polymer to flow under Linear Viscoelastic (LVE) conditions. As a result, these polymer entanglements hamper flow and create a deviation from the LVE conditions as observed as a hook formation. The strain hardening phenomenon becomes more severe as strain and strain rate increase due to faster and more severe polymer chain entanglement motion. Virgin polymers without long-chain branching will exhibit LVE flow characteristics. In comparison, long-chain branched polymers will exhibit strain hardening and which causes a deviation from the LVE flow characteristics of the virgin polymer providing the hook formation under the same test conditions.

The second analytical method used to observe the presence of long-chain branching is evaluating melt strength data as tested per ISO 16790 which is incorporated by reference herein in its entirety. An amount of melt strength is known to be directly related to the presence of long-chain branching when compared to similar virgin polymers lacking long-chain branching. By way of example, Borealis DAPLOY™ WB140HMS Polypropylene (PP) (available from Borealis AG) is compared to other polymers having similar molecular weight, polydispersity index, and other physical characteristics. The DAPLOY™ WB140HMS PP has a melt strength which exceeds about 36 cN while other similar PP resins lacking long-chain branching have a melt strength of less than about 10 cN.

Melt flow index (MFI) is an indirect measure of the viscosity of a polymer when molten. The index is defined as the mass of polymer melt that will flow through a capillary of a specific diameter and length by a pressure applied in 10 minutes, as described in ASTM D1238. For example, the Marlex® HHM 5502BN HDPE hexene copolymer (Chevron Phillips) has a melt flow index of 0.35 g/10 min per ASTM D1238. A larger melt index value indicates a lower viscosity. Higher molecular weight polymers will be more viscous and less will flow under the same conditions so the melt index will be a smaller number.

In certain exemplary embodiments, the formulation may include two base resins that are HDPE. One illustrative example of the formulation includes a first base resin of FORMOLENE® HB5502F HDPE hexene copolymer (available from Formosa Plastics Corporation) and a second base resin of EQUISTAR® ALATHON® H5520 HDPE copolymer (available from Lyondell Chemical Company). In embodiments with more than one HDPE copolymer, different HDPE copolymers can be used depending on the attributes desired in the formulation. For example, a formulation may include both electron-beam modified EQUISTAR® ALATHON® H5520 and FORMOLENE® HB5502F HDPE. In such an embodiment, the EQUISTAR® ALATHON® H5520 provides higher melt strength which increases foaming potential, and has less flexural modulus or brittleness. The FORMOLENE® HB5502F HDPE provides wide unimodal polydispersity index of the molecular weight distribution and maximizes economic advantage.

In another example, a formulation includes about 50% electron-beam modified EQUISTAR® ALATHON® H5520 and about 50% FORMOLENE® HB5502F HDPE. The combination provides a material having drop resistance capability associated with a non-modified HDPE resin and increased melt strength of an electron-beam modified long-chain branched HDPE. Depending on the desired characteristics, the percentage of the HDPE base resin between the two HDPE base resins may be varied, e.g., 25%/75%, 30%/70%, 35%/65%, 40%/60%, 45%/55%, 50%/50%, etc., by weight of the base resins. In an embodiment, a formulation includes three HDPE base resins. Again, depending on the desired characteristics, the percentage of three HDPE copolymers can be varied, 33%/33%/33%, 30%/30%/40%, 25%/25%/50%, etc., by weight of the base resins.

Polymeric material as disclosed herein includes at least one base resin. In illustrative embodiments, the at least one base resin can be HDPE. The amount of a base resin may be one of several different values or fall within one of several different ranges. It is within the scope of the present disclosure to select an amount of base resin to be one of the following values: about 25%, 30%, 35%, 40%, 45%, 50%, 55%, 60%, 65%, 70%, 75%, 80%, 85%, 86%, 87%, 88%, 89%, 90%, 91%, 92%, 93%, 94%, 95%, 96%, 97%, 98%, 99%, 99.5%, and 99.9% of the total formulation of the polymeric layer by weight percentage. It is within the present disclosure for the amount of base resin in the formulation to fall within one of many different ranges. In a first set of ranges, the range of base resin is one of the following ranges: about 25% to 99.9%, 85% to 99.9%, 90% to 99.9%, 95% to 99.9%, 98% to 99.9%, and 99% to 99.9% of the total formulation of the polymeric layer by weight percentage. In a second set of ranges, the range of base resin is one of the following ranges: about 85% to 99%, 85% to 98%, 85% to 95%, and 85% to 90% of the total formulation of the polymeric layer by weight percentage. In a third set of ranges, the range of base resin is one of the following ranges: about 90% to 99% and 95% to 98% of the total formulation by weight percentage. Each of these values and ranges is embodied in Examples 1 to 13. In an embodiment, the base resin can be 100% virgin base resin. In an embodiment, the base resin can be a mixture of virgin base resin and regrind base resin. For example, the base resin can be 100%, 90%, 80%, 75%, 70%, 60%, 50%, 40%, 30%, 25%, 20%, or 10% virgin base resin with the remainder being a regrind. For example, the base resin can be 50% virgin HDPE and 50% regrind.

The term polymeric layer refers to a polymeric monolayer, a polymeric core layer in a multilayer material, or a non-core polymeric layer in a multilayer material.

The formulation used to produce the insulative cellular non-aromatic polymeric material may further include one or more cell-forming agents. Cell-forming agents include nucleating agents and blowing agents. A nucleating agent is used to provide and control nucleation sites within a molten formulation to promote formation of cells, bubbles, or voids in the molten formulation during extrusion. A blowing agent is used to grow cells in the molten material at nucleation sites. Blowing agents may be used alone in the formulation or with nucleating agents.

Formulations used to produce insulative cellular non-aromatic polymeric materials may include one or more cell-forming agents. The amount of a nucleating agent may be one of several different values or fall within one of several different ranges. It is within the scope of the present disclosure to select an amount of a nucleating agent to be one of the following values: about 0%, 1%, 2%, 3%, 4%, 5%, 6%, 7%, 8%, 9%, 10%, 11%, 12%, 13%, 14%, and 15%, of the total formulation of the polymeric layer by weight percentage. It is within the scope of the present disclosure for the amount of a physical nucleating agent in the formulation to fall within one of many different ranges. In a first set of ranges, the range of a physical nucleating agent is one of the following ranges: about 0.1% to 15% (w/w), 0.25% to 15%, 0.5% to 15%, 0.75% to 15%, 1% to 15%, 2% to 15%, 3% to 15%, 4% to 15%, and 5% to 15% of the total formulation of the polymeric layer by weight percentage. In a second set of ranges, the range of a nucleating agent is one of the following ranges: about 0.1% to 10%, 0.25% to 10%, 0.5% to 10%, 0.75% to 10%, 1% to 10%, 2% to 10%, 3% to 10%, 4% to 10%, and about 5% to 10% of the total formulation of the polymeric layer by weight percentage. In a third set of ranges, the range of a nucleating agent is one of the following ranges: about 0.1% to 5%, 0.25% to 5%, 0.5% to 5%, 0.75% to 5%, 1% to 5%, 1.5% to 5%, 2% to 5%, 2.5% to 5%, 3% to 5%, 3.5% to 5%, 4% to 5%, and 4.5% to 5% of the total formulation of the polymeric layer by weight percentage.

Nucleating agent means a chemical or physical agent that provides sites for cells to form in a molten material. Nucleating agents may include chemical nucleating agents and physical nucleating agents. The nucleating agent may be blended with the formulation that is introduced into the hopper of the extruder. Alternatively, the nucleating agent may be added to the molten resin mixture in the extruder.

Suitable physical nucleating agents have desirable particle size, aspect ratio, and top-cut properties. Examples include, but are not limited to, talc, $CaCO_3$, mica, and mixtures of at least two of the foregoing. One representative example is Heritage Plastics HT6000 Linear Low Density Polyethylene (LLDPE) Based Talc Concentrate.

Formulations used to produce insulative cellular non-aromatic polymeric materials may include one or more cell-forming agents. The amount of a physical nucleating agent may be one of several different values or fall within one of several different ranges. It is within the scope of the present disclosure to select an amount of physical nucleating agent, such as talc, to be one of the following values: about 0%, 1%, 2%, 3%, 4%, 5%, 6%, and 7% of the total formulation of the polymeric layer by weight percentage. It is within the scope of the present disclosure for the amount of a physical nucleating agent in the formulation to fall within one of many different ranges. In a first set of ranges, the range of a physical nucleating agent is one of the following ranges: about 0% to 7% (w/w), 0.1% to 7%, 0.25% to 7%, 0.5% to 7%, 0.75% to 7%, 1.0% to 7%, 1.25% to 7%, 1.5% to 7%, 1.75% to 7%, 2.0% to 7%, 2.25% to 7%, 2.5% to 7%, 3% to 7%, 4% to 7%, 5% to 7%, and 6% to 7% of the total formulation of the polymeric layer. In a second set of ranges, the range of a physical nucleating agent is one of the following ranges: about 0% to 6%, 0% to 5%, 0% to 4%, 0% to 3.0%, 0% to 2.5%, 0% to 2.25%, 0% to 2.0%, 0% to 1.75%, 0% to 1.5%, 0% to 1.25%, 0% to 1.0%, 0% to 0.75%, and 0% to 0.5% of the total formulation of the polymeric layer. In a third set of ranges, the range of a physical nucleating agent is one of the following ranges: about 0.1% to 6%, 0.5% to 5%, 1% to 4%, and 2% to 3% of the total formulation of the polymeric layer. In an embodiment, the formulation lacks talc.

Suitable chemical nucleating agents decompose to create cells in the molten formulation when a chemical reaction temperature is reached. These small cells act as nucleation sites for larger cell growth from a physical or other type of blowing agent. In one example, the chemical nucleating agent is citric acid or a citric acid-based material. One representative example is HYDROCEROL™ CF-40E (available from Clariant Corporation), which contains citric acid and a crystal nucleating agent.

A blowing agent refers to a physical or a chemical material (or combination of materials) that acts to expand nucleation sites. Blowing agents may include only chemical blowing agents, only physical blowing agents, combinations thereof, or several types of chemical and physical blowing agents. The blowing agent acts to reduce density by forming cells in the molten formulation at the nucleation sites. The blowing agent may be added to the molten resin mixture in the extruder.

Chemical blowing agents are materials that degrade or react to produce a gas. Chemical blowing agents may be endothermic or exothermic. Chemical blowing agents typically degrade at a certain temperature to decompose and release gas. One example of a chemical blowing agent is citric acid or citric-based material. One representative example is HYDROCEROL™ CF-40E (available from Clariant Corporation), which contains citric acid and a crystal nucleating agent. Here, the citric acid decomposes at the appropriate temperature in the molten formulation and forms a gas which migrates toward the nucleation sites and grows cells in the molten formulation. If sufficient chemical blowing agent is present, the chemical blowing agent may act as both the nucleating agent and the blowing agent. However, a chemical blowing agent does not always act as a nucleating agent.

In another example, chemical blowing agents may be selected from the group consisting of azodicarbonamide; azodiisobutyro-nitrile; benzenesulfonhydrazide; 4,4-oxybenzene sulfonylsemicarbazide; p-toluene sulfonyl semicarbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; p-toluene sulfonyl azide, and combinations thereof.

In one aspect of the present disclosure, where a chemical blowing agent is used, the chemical blowing agent may be introduced into the material formulation that is added to the hopper.

Formulations used to produce insulative cellular non-aromatic polymeric materials may include one or more chemical blowing agents. The amount of a chemical blowing agent may be one of several different values or fall within one of several different ranges. It is within the scope of the present disclosure to select an amount of a chemical blowing agent to be one of the following values: about 0%, 0.1%, 0.5%, 0.75%, 1%, 1.5%, 2%, 3%, 4%, and 5%, of the total formulation of the polymeric layer by weight percentage. It is within the scope of the present disclosure for the amount of a physical nucleating agent in the formulation to fall within one of many different ranges. In a first set of ranges, the range of a physical nucleating agent is one of the following ranges: about 0.1% to 5% (w/w), 0.25% to 5%, 0.5% to 5%, 0.75% to 5%, 1% to 5%, 1.5% to 5%, and 2% to 5% of the total formulation of the polymeric layer by weight percentage. In a second set of ranges, the range of a nucleating agent is one of the following ranges: about 0.1% to 2%, 0.25% to 2%, 0.5% to 2%, 0.75% to 2%, 1% to 2%, and 1.5% to 2% of the total formulation by weight percentage. In a third set of ranges, the range of a nucleating agent is one of the following ranges: about 0.1% to 1%, 0.25% to 1%, 0.5% to 1%, and 0.75% to 1%, of the total formulation of the polymeric layer by weight percentage.

One example of a physical blowing agent is nitrogen ($N_2$). The $N_2$ is pumped into the molten formulation via a port in the extruder as a supercritical fluid. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, air, pentane, butane, or other alkane mixtures of the foregoing and the like. In an illustrative example, a physical blowing agent may be introduced at a rate of about 0.02 pounds per hour to about 1.3 pounds per hour. In another illustrative example, the physical blowing agent may be introduced at a rate of about 0.03 pounds per hour to about 1.25 pounds per hour. In another illustrative example, the physical blowing agent may be introduced at a rate of about 0.03 to about 0.15 pounds per hour. In still yet another illustrative example, the physical blowing agent may be introduced at a rate of about 0.05 pounds per hours to about 0.15 pounds per hour.

In one aspect of the present disclosure, at least one slip agent may be incorporated into the formulation to aid in increasing production rates. Slip agent (also known as a process aid) is a term used to describe a general class of materials that is added to a formulation to provide surface lubrication to the polymer during and after conversion. Slip agents may also reduce or eliminate die drool. Representative examples of slip agents include amides of fats or fatty acids, such as, but not limited to, erucamide and oleamide. In one exemplary aspect, amides from oleyl (single unsaturated C-18) through erucyl (C-22 single unsaturated) may be used. Other representative examples of a slip agent include low molecular weight amides and fluoroelastomers. Combinations of two or more slip agents can be used. Slip agents may be provided in a master batch pellet form and blended with the resin formulation. One example of a suitable slip agent is Ampacet 102823 Process Aid PE MB LLDPE.

Formulations used to produce insulative cellular non-aromatic polymeric materials may include one or more slip agents. The amount of a slip agent may be one of several different values or fall within one of several different ranges. It is within the scope of the present disclosure to select an amount of a slip agent to be one of the following values: about 0%, 0.1%, 0.25%, 0.5%, 0.75%, 1%, 1.25%, 1.5%, 1.75%, 2%, 2.25%, 2.5%, 2.75% and 3% of the total formulation of the polymeric layer by weight percentage. It is within the scope of the present disclosure for the amount of a slip agent in the formulation to fall within one of many different ranges. In a first set of ranges, the range of a slip agent is one of the following ranges: about 0% to 3% (w/w), 0.1% to 3%, 0.25% to 3%, 0.5% to 3%, 0.75% to 3%, 1% to 3%, 1.25% to 3%, 1.5% to 3%, 1.75% to 3%, 2% to 3%, 2.25% to 3%, and 2.5% to 3% of the total formulation of the polymeric layer by weight percentage. In a second set of ranges, the range of a slip agent is one of the following ranges: about 0% to 2.5%, 0% to 2.25%, 0% to 2%, 0% to 1.75%, 0% to 1.5%, 0% to 1.25%, 0% to 1%, 0% to 0.75%, and 0% to 0.5% of the total formulation of the polymeric layer by weight percentage. In a third set of ranges, the range of a slip agent is one of the following ranges: about 0.1% to 2.5%, 0.25% to 2.25%, 0.5% to 2%, 0.75%, to 1.75%, and 1% to 1.5% of the total formulation by weight percentage. In an embodiment, the formulation lacks a slip agent.

In another aspect of the present disclosure, an impact modifier may be incorporated into a formulation to minimize fracturing of the insulative cellular non-aromatic polymeric material when subjected to an impact such as a drop test. One representative example of a suitable impact modifier is DOW® AFFINITY™ PL 1880G polyolefin plastomer.

Formulations used to produce insulative cellular non-aromatic polymeric materials may include one or more colorants. The amount of a colorant may be one of several different values or fall within one of several different ranges. It is within the scope of the present disclosure to select an amount of a colorant to be one of the following values: about 0%, 0.1%, 0.25%, 0.5%, 0.75%, 1%, 2%, 3%, and 4% of the total formulation of the polymeric layer by weight percentage. It is within the scope of the present disclosure for the amount of a colorant in the formulation to fall within one of many different ranges. In a first set of ranges, the range of a colorant is one of the following ranges: about 0% to 4% (w/w), 0.1% to 4%, 0.25% to 4%, 0.5% to 4%, 0.75% to 4%, 1% to 4%, 1.25% to 4%, 1.5% to 4%, 1.75% to 4%, 2% to 4%, 2.25% to 4%, 2.5% to 4%, and 3% to 4% of the total formulation of the polymeric layer by weight percentage. In a second set of ranges, the range of a colorant is one of the following ranges: about 0% to 3%, 0% to 2.5%, 0% to 2.25%, 0% to 2%, 0% to 1.75%, 0% to 1.5%, 0% to 1.25%, 0% to 1%, 0% to 0.75%, and 0% to 0.5% of the total formulation of the polymeric layer by weight percentage. In a third set of ranges, the range of a colorant is one of the following ranges: about 0.1% to 3.5%, 0.5% to 3%, 0.75% to 2.5%, and 1% to 2% of the total formulation by weight percentage. In an embodiment, the formulation lacks a colorant.

A material-formulation process in accordance with the present disclosure uses a polyethylene-based formulation to produce a strip of insulative cellular non-aromatic polymeric material. Raw material according to the polyethylene-based material is gravity fed into the barrel of an extruder where it is heated to produce a molten material. A cell-forming agent is then introduced into the molten material prior to extrusion. As the molten materials exit the extruder, cells nucleate in the molten material, and the molten material expands and cools to form a sheet of insulative cellular non-aromatic polymeric material.

An insulative cellular non-aromatic polymeric material produced in accordance with the present disclosure can be formed to produce an insulative cup or an insulative container. In another illustrative example, the insulative cellular non-aromatic polymeric material produces a monolayer tube or monolayer parison that is blow molded to form an insulative container (e.g., bottle). In an embodiment, a monolayer foamed bottle further includes an extruded second layer (i.e., skin layer). In illustrative embodiments, a second layer can be linear low density polyethylene (LLDPE), low density polyethylene (LDPE), medium density polyethylene (MDPE), high density polyethylene (HDPE), polypropylene homopolymer, polypropylene impact copolymer, polypropylene random polymer, polystyrene, polyethylene terephthalate (PET), or polyvinyl chloride (PVC).

In an example, a multi-layer container includes a core layer and at least one non-core layer. In an illustrative example, a core layer is sandwiched between an inner polymeric layer and an outer polymeric layer. In an example, each layer (core and non-core layers) of the multi-layer container includes at least one HDPE base resin. In an embodiment, a non-core layer can include fiber. A suitable fiber can be a synthetic fiber that reinforces polyolefin formulations to provide, e.g., higher stiffness to the material and better feeding and handling during extrusion or blow molding process. A suitable fiber for a polymeric layer includes a synthetic, mineral based fiber, such as Hyperform® HPR-803i (Milliken & Co., Spartanburg, S.C.). In an embodiment, one or more non-core polymeric layers includes fiber. In an illustrative embodiment, a multi-layer container has fiber in an outer polymeric layer but an inner polymeric layer does not include fiber. In an illustrative example, a multi-layer container is a bottle having a) a core layer comprising HDPE, a chemical blowing agent, and talc; b) an outer polymeric layer comprising HDPE, a colorant, and fiber; and c) an inner polymeric layer comprising HDPE and fiber. In an embodiment, the multi-layer bottle has a density of about 0.4 g/cm$^3$ to about 0.5 g/cm$^3$.

Non-core layers used to produce insulative cellular non-aromatic polymeric materials may include fiber. The amount of fiber may be one of several different values or fall within one of several different ranges. It is within the scope of the present disclosure to select an amount of fiber to be one of the following values: about 5%, 10%, 15%, 20%, and 25% of the layer by weight percentage. It is within the scope of the present disclosure for the amount of fiber in the layer to fall within one of many different ranges. In a first set of ranges, the range of fiber is one of the following ranges: about 0% to 25% (w/w), 5% to 25%, 10% to 25%, 15% to 25%, and 20% to 25 of the total layer by weight percentage. In a second set of ranges, the range of fiber is one of the following ranges: about 0% to 25%, 0% to 20%, 0% to 15%, 0% to 10%, and 0% to 5% of the total layer by weight percentage. In a third set of ranges, the range of a colorant is one of the following ranges: about 5% to 20%, 5% to 15%, 5% to 10%, 10% to 20%, and 10% to 15% of the total layer by weight percentage. In an embodiment, non-core layers lack fiber.

In an embodiment, the insulative cellular non-aromatic polymeric material is located between and coupled to an inner polymeric layer and an outer polymeric layer to produce a multi-layer tube. For example, the multi-layer tube can be a bottle. The density of the tube may be one of several different values or fall within one several different ranges. It is within the scope of the present disclosure for the density of the tube to fall within one of many different ranges. In a first set of ranges, the density is one of the following ranges: about 0.5 g/cm$^3$ to 0.92 g/cm$^3$, 0.6 g/cm$^3$ to 0.92 g/cm$^3$, 0.65 g/cm$^3$ to 0.92 g/cm$^3$, 0.7 g/cm$^3$ to 0.92 g/cm$^3$, 0.75 g/cm$^3$ to 0.92 g/cm$^3$, 0.8 g/cm$^3$ to 0.92 g/cm$^3$, 0.85 g/cm$^3$ to 0.92 g/cm$^3$, and 0.9 g/cm$^3$ to 0.92 g/cm$^3$. In a first set of ranges, the density is one of the following ranges: about 0.5 g/cm$^3$ to 0.9 g/cm$^3$, 0.6 g/cm$^3$ to 0.9 g/cm$^3$, 0.65 g/cm$^3$ to 0.9 g/cm$^3$, 0.7 g/cm$^3$ to 0.9 g/cm$^3$, 0.75 g/cm$^3$ to 0.9 g/cm$^3$, 0.8 g/cm$^3$ to 0.9 g/cm$^3$, and 0.85 g/cm$^3$ to 0.9 g/cm$^3$. In a third set of ranges, the density is one of the following ranges: about 0.6 g/cm$^3$ to 0.85 g/cm$^3$, 0.65 g/cm$^3$ to 0.8 g/cm$^3$, and 0.7 g/cm$^3$ to 0.75 g/cm$^3$, In an embodiment, the insulative cellular non-aromatic polymeric material is located between and coupled to an inner polymeric layer and an outer polymeric layer to produce a multi-layer parison. The density of the multi-layer parison may be one of several different values or fall within one several different ranges. It is within the scope of the present disclosure for the density of the multi-layer parison to fall within one of many different ranges. In a first set of ranges, the density is one of the following ranges: about 0.4 g/cm$^3$ to 0.8 g/cm$^3$, 0.45 g/cm$^3$ to 0.8 g/cm$^3$, 0.5 g/cm$^3$ to 0.8 g/cm$^3$, 0.55 g/cm$^3$ to 0.8 g/cm$^3$, 0.6 g/cm$^3$ to 0.8 g/cm$^3$, 0.65 g/cm$^3$ to 0.8 g/cm$^3$, 0.7 g/cm$^3$ to 0.8 g/cm$^3$, and 0.75 g/cm$^3$ to 0.8 g/cm$^3$. In a second set of ranges, the density of a multi-layer parison is one of the following ranges: about 0.4 g/cm$^3$ to 0.75 g/cm$^3$, 0.4 g/cm$^3$ to 0.7 g/cm$^3$, 0.4 g/cm$^3$ to 0.65 g/cm$^3$, 0.4 g/cm$^3$ to 0.6 g/cm$^3$, 0.4 g/cm$^3$ to 0.55 g/cm$^3$, 0.4 g/cm$^3$ to 0.5 g/cm$^3$, and 0.4 g/cm$^3$ to 0.45 g/cm$^3$. In a third set of ranges, the density of a multi-layer parison is one of the following ranges: about 0.45 g/cm$^3$ to 0.7 g/cm$^3$, 0.5 g/cm$^3$ to 0.65 g/cm$^3$, and 0.55 g/cm$^3$ to 0.6 g/cm$^3$. Density was determined according to the density test procedure outlined in Example 14.

In an embodiment, a throughput system includes a multi-parison drop. For example, an extrusion line starts as a single line and then splits into 2, 3, 4, 5, or more lines for multiple parison drops. In an embodiment, the RPMs for the extrusion stream start at a particular level (e.g., 48 RPM) and splits evenly into 2 (e.g., 24 RPM each), 3 (e.g., 16 RPM each), 4 (12 RPM each), or more multi-parison drops splitting the RPMs. A more efficient output can be achieved by splitting the extrusion stream into multiple parison drop streams. Thereby, an embodiment includes a system comprising an extrusion stream that splits into multiple parison streams. In an embodiment, the system provides multiple foamed parison drops. Such a system that splits the extrusion line into multiple parison drops can produce foamed bottle. In an embodiment, the foamed bottles have densities as described herein.

Containers (e.g., bottles) can be subjected to a drop test, which is a test to determine a container's ability to withstand free-fail impact forces. Containers that do not pass the drop test are not suitable for commercial applications. In an illustrative embodiment, the insulative cellular non-aromatic polymeric material is coupled and located between two polymeric layers to form a multi-layer parison. The multi-layer parison is then formed, for example, via blow molding into a container. The container is then filled with water and closed off with, for example, a lid. The sample container is then held at about 73 degrees Fahrenheit (22.8 degrees Celsius) and about 50% relative humidity. The filled, capped containers are then subjected to the following drop test procedure: (a) the filled, capped container is located at about five feet above a hard surface such as concrete or tile; (b) the filled, capped container is then oriented such that a bottom of the filled, capped container is arranged to lie in substantially parallel relation to the hard surface; (c) each of ten capped, filled containers are dropped; (d) upon impact, each filled, capped container is examined for any break or shattering of the wall that causes water to leak out of the bottle; and (d) the total number of bottles showing any sign of leakage after the drop test are counted as failures.

A method of producing a container or parison as described herein includes extruding or blow-molding any of the formulations described herein.

In an illustrative embodiment, a formulation for producing an insulative cellular non-aromatic polymeric material includes 98% HDPE, 0.5% chemical blowing agent (CBA), and 1.5% nucleating agent (e.g., talc). The formulation can be used to produce a material that is a) a monolayer forming a container or parison or b) the core layer in a multi-layer container or parison. In an illustrative multi-layer embodiment, a core layer of 98% HDPE, 0.5% CBA, and 1.5% nucleating agent can be sandwiched between at least one inner polymeric layer and at least one outer polymeric layer. An illustrative outer polymeric layer includes i) 80% HDPE, ii) 5% colorant, and iii) 15% fiber. An illustrative inner polymeric layer includes 85% HDPE and 15% fiber.

In an illustrative embodiment, a formulation for producing an insulative cellular non-aromatic polymeric material includes 98.75% HDPE, 0.75% chemical blowing agent (CBA), and 0.2% nucleating agent (e.g., talc).

In an illustrative embodiment, a formulation for producing an insulative cellular non-aromatic polymeric material includes 98% HDPE and 2.0% chemical blowing agent (CBA).

In an illustrative embodiment, a formulation for producing an insulative cellular non-aromatic polymeric material includes 96.5% HDPE, 0.5% chemical blowing agent (CBA), 2% slip agent, and 1% colorant.

In an illustrative embodiment, a formulation for producing an insulative cellular non-aromatic polymeric material includes 95% HDPE, 1.5% chemical blowing agent (CBA), 2% slip agent, 0.5% nucleating agent (e.g., talc) and 1% colorant, wherein the 95% is a 50%/50% blend of two separate HDPE resins. Thus, each HDPE resin is 47.5% of the total formulation of the polymeric layer by weight percentage.

In an illustrative embodiment, a formulation for producing an insulative cellular non-aromatic polymeric material includes 82.54% HDPE, 0.62% chemical blowing agent (CBA), 2.49% slip agent, 11.16% nucleating agent (e.g., talc) and 3.19% colorant.

The following numbered paragraphs define particular embodiments of the insulative cellular non-aromatic polymeric material formulation of the invention:

1) 80-99.9 wt % of at least one HDPE polymeric resin;
0.1-12 wt % of at least one nucleating agent selected from physical nucleating agents and chemical nucleating agents; and
optionally, the balance of the formulation comprising one or more additives selected from slip agents, colorants and impact modifiers.

2) 80-99.9 wt % of at least one HDPE polymeric resin;
0.1-12 wt % of at least one nucleating agent selected from physical nucleating agents and chemical nucleating agents;
0.5-3 wt % of at least one slip agent; and
optionally the balance of the formulation comprising one or more additives selected from colorants and impact modifiers.

3) 84-99.9 wt % of at least one HDPE polymeric resin;
0.1-3 wt % of at least one nucleating agent selected from physical nucleating agents and chemical nucleating agents; and
optionally the balance of the formulation comprising one or more additives selected from slip agents, colorants and impact modifiers.

4) 84-99.9 wt % of at least one HDPE polymeric resin;
0.1-3 wt % of at least one nucleating agent selected from physical nucleating agents and chemical nucleating agents;
0.5-3 wt % of at least one slip agent; and
optionally the balance of the formulation comprising one or more additives selected from colorants and impact modifiers.

5) 85-99.9 wt % of at least one HDPE polymeric resin;
0.1-2.5 wt % of at least one nucleating agent selected from physical nucleating agents and chemical nucleating agents; and
optionally the balance of the formulation comprising one or more additives selected from slip agents, colorants and impact modifiers.

6) 85-99.9 wt % of at least one HDPE polymeric resin;
0.1-2.5 wt % of at least one nucleating agent selected from physical nucleating agents and chemical nucleating agents;
0.5-3 wt % of at least one slip agent; and
optionally the balance of the formulation comprising one or more additives selected from colorants and impact modifiers.

7) 85-99.7 wt % of at least one HDPE polymeric resin;
0.1-2.5 wt % of at least one nucleating agent selected from physical nucleating agents and chemical nucleating agents; and
optionally the balance of the formulation comprising one or more additives selected from slip agents, colorants and impact modifiers.

8) 85-99.7 wt % of at least one HDPE polymeric resin;
0.1-2.5 wt % of at least one nucleating agent selected from physical nucleating agents and chemical nucleating agents;
0.5-2.5 wt % of at least one slip agent; and
optionally the balance of the formulation comprising one or more additives selected from colorants and impact modifiers.

9) 87-99.7 wt % of at least one HDPE polymeric resin;
0.1-2.5 wt % of at least one nucleating agent selected from physical nucleating agents and chemical nucleating agents; and
optionally the balance of the formulation comprising one or more additives selected from slip agents, colorants and impact modifiers.

10) 87-99.7 wt % of at least one HDPE polymeric resin;
0.1-2.5 wt % of at least one nucleating agent selected from physical nucleating agents and chemical nucleating agents;
0.8-2.5 wt % of at least one slip agent; and
optionally the balance of the formulation comprising one or more additives selected from colorants and impact modifiers.

11) 90-99.7 wt % of at least one HDPE polymeric resin;
0.1-2.5 wt % of at least one nucleating agent selected from physical nucleating agents and chemical nucleating agents; and
optionally the balance of the formulation comprising one or more additives selected from slip agents, colorants and impact modifiers.

12) 90-99.7 wt % of at least one HDPE polymeric resin;
0.1-2.5 wt % of at least one nucleating agent selected from physical nucleating agents and chemical nucleating agents;
0.8-2.5 wt % of at least one slip agent; and
optionally the balance of the formulation comprising one or more additives selected from colorants and impact modifiers.

13) 90-99.7 wt % of at least one HDPE polymeric resin;
0.1-2.2 wt % of at least one nucleating agent selected from physical nucleating agents and chemical nucleating agents; and
optionally the balance of the formulation comprising one or more additives selected from slip agents, colorants and impact modifiers.

14) 90-99.7 wt % of at least one HDPE polymeric resin;
0.1-2.2 wt % of at least one nucleating agent selected from physical nucleating agents and chemical nucleating agents;
0.8-2.5 wt % of at least one slip agent; and
optionally the balance of the formulation comprising one or more additives selected from colorants and impact modifiers.

15) 92-99.7 wt % of at least one HDPE polymeric resin;
0.1-2.2 wt % of at least one nucleating agent selected from physical nucleating agents and chemical nucleating agents; and
optionally the balance of the formulation comprising one or more additives selected from slip agents, colorants and impact modifiers.

16) 92-99.7 wt % of at least one HDPE polymeric resin;
0.1-2.2 wt % of at least one nucleating agent selected from physical nucleating agents and chemical nucleating agents;
0.8-2.5 wt % of at least one slip agent; and
optionally the balance of the formulation comprising one or more additives selected from colorants and impact modifiers.
17) 95-99.7 wt % of at least one HDPE polymeric resin;
0.1-2.0 wt % of at least one nucleating agent selected from physical nucleating agents and chemical nucleating agents; and
optionally the balance of the formulation comprising one or more additives selected from slip agents, colorants and impact modifiers.
18) 95-99.7 wt % of at least one HDPE polymeric resin;
0.1-2.0 wt % of at least one nucleating agent selected from physical nucleating agents and chemical nucleating agents;
0.8-2.5 wt % of at least one slip agent; and
optionally the balance of the formulation comprising one or more additives selected from colorants and impact modifiers.
19) 95-99.5 wt % of at least one HDPE polymeric resin;
0.1-2.0 wt % of at least one nucleating agent selected from physical nucleating agents and chemical nucleating agents; and
optionally the balance of the formulation comprising one or more additives selected from slip agents, colorants and impact modifiers.
20) 95-99.5 wt % of at least one HDPE polymeric resin;
0.1-2.0 wt % of at least one nucleating agent selected from physical nucleating agents and chemical nucleating agents;
0.8-2.5 wt % of at least one slip agent; and
optionally the balance of the formulation comprising one or more additives selected from colorants and impact modifiers.

In any of the numbered paragraphs (1)-(20) above, the one or more HDPE polymeric resin may be selected from HDPE homopolymer or HDPE copolymer. Suitably, the one or more HDPE polymeric resin is selected from DOW® DOWLEX™ IP 41 HDPE (available from The Dow Chemical Company) that has been electron-beam modified to provide long-chain branching and a melt index of about 0.25 g/10 min, EQUISTAR® ALATHON® H5520 HDPE copolymer (available from Lyondell Chemical Company) that has been electron-beam modified to have long-chain branching and a melt index of about 0.25 g/10 min, FORMOLENE® HB5502F HDPE hexene copolymer (available from Formosa Plastics Corporation), and Marlex® HHM 5502BN HDPE hexene copolymer. In one embodiment, the one or more HDPE polymeric resin is DOW® DOWLEX™ IP 41 HDPE. In another embodiment, the one or more HDPE polymeric resin is DOW® DOWLEX™ IP 41 HDPE and FORMOLENE® HB5502F HDPE hexene copolymer. In another embodiment, the one or more HDPE polymeric resin is FORMOLENE® HB5502F HDPE hexene copolymer and EQUISTAR® ALATHON® H5520 HDPE copolymer. In one embodiment, the one or more HDPE polymeric resin is DOW® DOWLEX™ IP 41 HDPE and Marlex® HHM 5502BN HDPE hexene copolymer.

In any of the numbered paragraphs (1)-(20) above, the at least one nucleating agent may be a physical nucleating agent selected from talc, CaCO3 and/or mica, and/or a chemical nucleating agent selected from citric acid or a citric acid-based material (e.g. HYDROCEROL™ CF-40E, available from Clariant Corporation). In one embodiment, the at least one nucleating agent is a mixture of talc and HYDROCEROL™ CF-40E. In another embodiment, the at least one nucleating agent is talc. In another embodiment, the at least one nucleating agent is HYDROCEROL™ CF-40E.

In any of the numbered paragraphs (1)-(20) above, the at least one slip agent may be selected from amides, fluoroelastomers, amides of fats or fatty acids, such as erucamide and oleamide, and amides from oleyl (single unsaturated C-18) through erucyl (C-22 single unsaturated). In one embodiment, the at least one slip agent is Ampacet 102823 Process Aid PE MB LLDPE.

In any of the numbered paragraphs (1)-(20) above, the colorant(s) may be selected from any suitable colorant. In one embodiment, the colorant is COLORTECH® 11933-19 Titanium Oxide Colorant.

In any of the numbered paragraphs (1)-(20) above, the impact modifier(s) may be selected from any suitable impact modifier. In one embodiment, the impact modifier is DOW® AFFINITY™ PL 1880G polyolefin plastomer.

The following numbered paragraphs define particular embodiments of the insulative cellular non-aromatic polymeric material formulation of the invention:
21) 80-99.9 wt % of at least one HDPE polymeric resin selected from DOW® DOWLEX™ IP 41 HDPE, EQUISTAR® ALATHON® H5520 HDPE copolymer, FORMOLENE® HB5502F HDPE hexene copolymer, and Marlex® HHM 5502BN HDPE hexene copolymer;
0.1-7 wt % of at least one nucleating agent selected from talc, CaCO$_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.
22) 80-99.9 wt % of at least one HDPE polymeric resin selected from DOW® DOWLEX™ IP 41 HDPE, EQUISTAR® ALATHON® H5520 HDPE copolymer, FORMOLENE® HB5502F HDPE hexene copolymer, and Marlex® HHM 5502BN HDPE hexene copolymer;
0.1-7 wt % of at least one nucleating agent selected from talc, CaCO$_3$, mica, and/or a chemical nucleating agent selected from citric acid or a citric acid-based material (e.g. HYDROCEROL™ CF-40E);
0.5-3 wt % of at least one slip agent; and
optionally the balance of the formulation comprising one or more additives selected from colorants and impact modifiers.
23) 84-99.9 wt % of at least one HDPE polymeric resin selected from DOW® DOWLEX™ IP 41 HDPE, EQUISTAR® ALATHON® H5520 HDPE copolymer, FORMOLENE® HB5502F HDPE hexene copolymer, and Marlex® HHM 5502BN HDPE hexene copolymer;
0.1-3 wt % of at least one nucleating agent selected from talc, CaCO$_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.
24) 84-99.9 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-3 wt % of at least one nucleating agent selected from talc, CaCO$_3$, mica, and/or a chemical nucleating agent selected from citric acid or a citric acid-based material (e.g. HYDROCEROL™ CF-40E);
0.5-3 wt % of at least one slip agent; and
optionally the balance of the formulation comprising one or more additives selected from colorants and impact modifiers.

25) 85-99.9 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.5 wt % of at least one nucleating agent selected from talc, $CaCO_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.

26) 85-99.9 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.5 wt % of at least one nucleating agent selected from talc, $CaCO_3$, mica, and/or a chemical nucleating agent selected from citric acid or a citric acid-based material (e.g. HYDROCEROL™ CF-40E);
0.5-3 wt % of at least one slip agent; and
optionally the balance of the formulation comprising one or more additives selected from colorants and impact modifiers.

27) 85-99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.5 wt % of at least one nucleating agent selected from talc, $CaCO_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.

28) 85-99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.5 wt % of at least one nucleating agent selected from talc, $CaCO_3$, mica, and/or a chemical nucleating agent selected from citric acid or a citric acid-based material (e.g. HYDROCEROL™ CF-40E);
0.5-2.5 wt % of at least one slip agent; and
optionally the balance of the formulation comprising one or more additives selected from colorants and impact modifiers.

29) 87-99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.5 wt % of at least one nucleating agent selected from talc, $CaCO_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.

30) 87-99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.5 wt % of at least one nucleating agent selected from talc, $CaCO_3$, mica, and/or a chemical nucleating agent selected from citric acid or a citric acid-based material (e.g. HYDROCEROL™ CF-40E);
0.8-2.5 wt % of at least one slip agent; and
optionally the balance of the formulation comprising one or more additives selected from colorants and impact modifiers.

31) 90-99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.5 wt % of at least one nucleating agent selected from talc, $CaCO_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.

32) 90-99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.5 wt % of at least one nucleating agent selected from talc, $CaCO_3$, mica, and/or a chemical nucleating agent selected from citric acid or a citric acid-based material (e.g. HYDROCEROL™ CF-40E);
0.8-2.5 wt % of at least one slip agent; and
optionally the balance of the formulation comprising one or more additives selected from colorants and impact modifiers.

33) 90-99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.2 wt % of at least one nucleating agent selected from talc, $CaCO_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.

34) 90-99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.2 wt % of at least one nucleating agent selected from talc, $CaCO_3$, mica, and/or a chemical nucleating agent selected from citric acid or a citric acid-based material (e.g. HYDROCEROL™ CF-40E);
0.8-2.5 wt % of at least one slip agent; and
optionally the balance of the formulation comprising one or more additives selected from colorants and impact modifiers.

35) 92-99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.2 wt % of at least one nucleating agent selected from talc, $CaCO_3$, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

36) 92-99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.2 wt % of at least one nucleating agent selected from talc, $CaCO_3$, mica, and/or a chemical nucleating agent selected from citric acid or a citric acid-based material (e.g. HYDROCEROL™ CF-40E);
0.8-2.5 wt % of at least one slip agent; and
optionally the balance of the formulation comprising one or more additives selected from colorants and impact modifiers.

37) 95-99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.0 wt % of at least one nucleating agent selected from talc, $CaCO_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.

38) 95-99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.0 wt % of at least one nucleating agent selected from talc, $CaCO_3$, mica, and/or a chemical nucleating agent selected from citric acid or a citric acid-based material (e.g. HYDROCEROL™ CF-40E);
0.8-2.5 wt % of at least one slip agent; and
optionally the balance of the formulation comprising one or more additives selected from colorants and impact modifiers.

39) 95-99.5 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.0 wt % of at least one nucleating agent selected from talc, $CaCO_3$, mica, and/or a chemical nucleating agent selected from citric acid or a citric acid-based material (e.g. HYDROCEROL™ CF-40E); and
optionally the balance of the formulation comprising one or more additives selected from slip agents, colorants and impact modifiers.

40) 95-99.5 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;
0.1-2.0 wt % of at least one nucleating agent selected from talc, $CaCO_3$, mica, and/or a chemical nucleating agent selected from citric acid or a citric acid-based material (e.g. HYDROCEROL™ CF-40E);
0.8-2.5 wt % of at least one slip agent; and
optionally the balance of the formulation comprising one or more additives selected from colorants and impact modifiers.

In any of the numbered paragraphs (20)-(40) above, the at least one slip agent may be selected from amides, fluoroelastomers, amides of fats or fatty acids, such as erucamide and oleamide, and amides from oleyl (single unsaturated C-18) through erucyl (C-22 single unsaturated). In one embodiment, the at least one slip agent is Ampacet 102823 Process Aid PE MB LLDPE.

In any of the numbered paragraphs (20)-(40) above, the colorant(s) may be selected from any suitable colorant. In one embodiment, the colorant is COLORTECH® 11933-19 Titanium Oxide Colorant.

In any of the numbered paragraphs (20)-(40) above, the impact modifier(s) may be selected from any suitable impact modifier. In one embodiment, the impact modifier is DOW® AFFINITY™ PL 1880G polyolefin plastomer.

One or more additional components and additives optionally may be incorporated, such as, but not limited to, colorants (such as, but not limited to, titanium dioxide), and compound regrind.

EXAMPLE 1

Formulation and Extrusion

DOW® DOWLEX™ IP 41 HDPE was used as the polyethylene base resin. The polyethylene base resin was blended with HYDROCEROL® CF 40E as a nucleating agent and N2 as a blowing agent. Ampacet 102823 Process Aid PE MB LLDPE was added as a slip agent and COLORTECH® 11933-19 was added as a colorant. The percentages were about:

| | |
|---|---|
| 96.5% | DOW ® DOWLEX ™ IP 41 HDPE |
| 0.5% | HYDROCEROL ® CF 40E |
| 2.0% | Ampacet 102823 Process Aid PE MB LLDPE |
| 1.0% | COLORTECH ® 11933-19 Titanium Oxide Colorant |

The HDPE, nucleating agents, slip agent, and colorant were added to an extruder hopper and blended to provide a formulation. The formulation was then heated in the extruder to form a molten material. The blowing agent was then added to the molten material at a rate of about:

| | |
|---|---|
| 0.092 | lbs/hr N2 |

The N2 was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which was then blow molded to form the insulative container.

Test Results

The insulative cellular non-aromatic polymeric material was mated to inner and outer polymeric layers to form a multi-layer parison having a density of about 0.480 grams per cubic centimeter. The multi-layer parison was then blow molded to establish an insulative container having a density of about 0.695 grams per cubic centimeter.

EXAMPLE 2

Formulation and Extrusion

DOW® DOWLEX™ IP 41 HDPE was used as the polyethylene base resin. The polyethylene base resin was blended with Heritage Plastics HT6000 LLDPE talc as a nucleating agent, HYDROCEROL® CF 40E as another nucleating agent, and N2 as a blowing agent. Ampacet 102823 Process Aid PE MB LLDPE was added as a slip agent and COLORTECH® 11933-19 was added as a colorant. The percentages were about:

| | |
|---|---|
| 87.4% | DOW® DOWLEX™ IP 41 HDPE |
| 5.33% | Heritage Plastics HT6000 LLDPE Based Talc Concentrate |
| 3.88% | COLORTECH® 11933-19 Titanium Oxide Colorant |
| 1.45% | HYDROCEROL® CF 40E |
| 1.94% | Ampacet 102823 Process Aid PE MB LLDPE |

The HDPE, nucleating agents, slip agent, and colorant were added to an extruder hopper and blended to provide a formulation. The formulation was then heated in the extruder to form a molten material. The blowing agent was then added to the molten material at a rate of about:

| | |
|---|---|
| 0.092 | lbs/hr N2 |

The N2 was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers and blow molded to establish and insulative container. The insulative container has a density of about 0.770 grams per cubic centimeter.

EXAMPLE 3

Formulation and Extrusion

DOW® DOWLEX™ IP 41 HDPE was used as the polyethylene base resin. The polyethylene base resin was blended with Heritage Plastics HT6000 LLDPE talc as a nucleating agent, HYDROCEROL® CF 40E as another nucleating agent, and $N_2$ as a blowing agent. Ampacet 102823 Process Aid PE MB LLDPE was added as a slip agent and COLORTECH® 11933-19 was added as a colorant. The percentages were about:

| | |
|---|---|
| 87.4% | DOW® DOWLEX™ IP 41 HDPE |
| 6.3% | Heritage Plastics HT6000 LLDPE Based Talc Concentrate |
| 3.19% | COLORTECH® 11933-19 Titanium Oxide Colorant |
| 0.62% | HYDROCEROL® CF 40E |
| 2.49% | Ampacet 102823 Process Aid PE MB LLDPE |

The HDPE, nucleating agents, slip agent, and colorant were added to an extruder hopper and blended to provide a formulation. The formulation was then heated in the extruder to form a molten material. The blowing agent was then added to the molten material at a rate of about:

| | |
|---|---|
| 0.092 | lbs/hr N2 |

The N2 was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers and blow molded to establish and insulative container. The insulative container has a density of about 0.750 grams per cubic centimeter.

EXAMPLE 4

Formulation and Extrusion

DOW® DOWLEX™ IP 41 HDPE was used as the polyethylene base resin. The polyethylene base resin was blended with HYDROCEROL® CF 40E as a nucleating agent and CO2 as a blowing agent. Ampacet 102823 Process Aid PE MB LLDPE was added as a slip agent and COLORTECH® 11933-19 was added as a colorant. The percentages were about:

| | |
|---|---|
| 98.25% | DOW® DOWLEX™ IP 41 HDPE |
| 0.25% | HYDROCEROL® CF 40E |
| 0.5% | COLORTECH® 11933-19 Titanium Oxide Colorant |
| 1.0% | Ampacet 102823 Process Aid PE MB LLDPE |

The HDPE, nucleating agent, slip agent, and colorant were added to an extruder hopper and blended to provide a formulation. The formulation was then heated in the extruder to form a molten material. The blowing agent was then added to the molten material at a rate of about:

| | |
|---|---|
| 0.09 | lbs/hr CO2 |

The CO2 was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers and blow molded to establish and insulative container. The insulative container has a density of about 0.794 grams per cubic centimeter.

EXAMPLE 5

Formulation and Extrusion

FORMOSA PLASTICS® FORMOLENE™ HB5502F HDPE hexene copolymer was used as the polyethylene base resin. The polyethylene base resin was blended with HYDROCEROL® CF 40E as a nucleating agent, Heritage Plastics HT6000 LLDPE talc as another nucleating agent, and N2 as a blowing agent. The percentages were about:

| | |
|---|---|
| 98.75% | FORMOLENE(T) HB5502F HDPE hexene copolymer |
| 0.2% | Heritage Plastics HT6000 LLDPE Based Talc Concentrate |
| 0.75% | HYDROCEROL ® CF 40E |

The HDPE and nucleating agents were added to an extruder hopper and blended to provide a formulation. The formulation was then heated in the extruder to form a molten material. The blowing agent was then added to the molten material at a rate of about:

| | |
|---|---|
| 0.125 | lbs/hr N2 |

The N2 was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers to form a multi-layer parison having a density of about 0.399 grams per cubic centimeter. The multi-layer parison was then blow molded to establish an insulative container having a density of about 0.610 grams per cubic centimeter.

EXAMPLE 6

Formulations and Test Results

FORMOSA PLASTICS® FORMOLENE® HB5502F HDPE hexene copolymer was used as the polyethylene base resin. To that polyethylene base resin, one or more nucleating agents such as HYDROCEROL® CF 40E, Heritage Plastics HT6000 LLDPE talc, or Heritage Plastics HT4HP were added. In addition, N2 or CO2 were added as a blowing agent. Furthermore, in some examples, Ampacet 102823 Process Aid PE MB LLDPE was added as a slip agent and COLORTECH® 11933-19 was added as a colorant. The various formulations and resulting multi-layer parison and insulative container densities are shown below in Table 1.

TABLE 1

Comparison of different insulative cellular non-aromatic polymeric material formulations to create various multi-layer parison and insulative container densities

| Trial | Base Resin | Additive #1 | Additive #2 | Additive #3 | Additive #4 | Gas [lbs/hr] | Bottle Density [g/cm$^3$] | Parison Density [g/cm$^3$] |
|---|---|---|---|---|---|---|---|---|
| 6.1 | 96.5% Formosa | 0.5% CF-40E | 2% Ampacet | 1% Colortech | | 0.09 CO2 | 0.797 | 0.481 |
| 6.2 | 95% Formosa | 1.5% CF-40E | 2% Ampacet | 1% Colortech | 0.5% HT4HP | 0.08 CO2 | 0.806 | 0.455 |
| 6.3 | 95% Formosa | 1.5% CF-40E | 2% Ampacet | 1% Colortech | 0.5% HT4HP | 0.11 CO2 | 0.753 | 0.451 |
| 6.4 | 95% Formosa | 1.5% CF-40E | 2% Ampacet | 1% Colortech | 0.5% HT4HP | 0.09 N2 | 0.690 | 0.455 |
| 6.5 | 95% Formosa | 1.5% CF-40E | 2% Ampacet | 1% Colortech | 0.5% HT4HP | 0.09 N2 | 0.693 | 0.447 |
| 6.6 | 95% Formosa | 1.5% CF-40E | 2% Ampacet | 1% Colortech | 0.5% HT4HP | 0.09 N2 | 0.718 | 0.467 |
| 6.7 | 96% Formosa | 0.5% CF-40E | 2% Ampacet | 1% Colortech | 0.5% HT4HP | 0.09 N2 | 0.785 | 0.503 |
| 6.8 | 96% Formosa | 0.5% CF-40E | 2% Ampacet | 1% Colortech | 0.5% HT4HP | 0.09 N2 | 0.788 | 0.516 |
| 6.9 | 96% Formosa | 0.5% CF-40E | 2% Ampacet | 1% Colortech | 0.5% HT4HP | 0.09 N2 | 0.736 | 0.495 |
| 6.10 | 96% Formosa | 0.5% CF-40E | 2% Ampacet | 1% Colortech | 0.5% HT4HP | 0.09 N2 | 0.752 | 0.496 |
| 6.11 | 96% Formosa | 0.5% CF-40E | 2% Ampacet | 1% Colortech | 0.5% HT4HP | 0.09 N2 | 0.749 | 0.473 |
| 6.12 | 96.5% Formosa | 0.5% CF-40E | 2% Ampacet | 1% Colortech | | 0.09 N$_2$ | 0.779 | 0.498 |
| 6.13 | 99.9% Formosa | 0.1% CF-40E | | | | 0.03 N$_2$ | 0.918 | 0.785 |
| 6.14 | 99.4% Formosa | 0.1% CF-40E | 0.5% HT6000 | | | 0.1 N$_2$ | 0.730 | 0.502 |
| 6.15 | 97.4% Formosa | 0.1% CF-40E | 2.5% HT6000 | | | 0.125 N$_2$ | 0.632 | 0.434 |
| 6.16 | 99.25% Formosa | 0.75% CF-40E | | | | 0.1 N$_2$ | 0.723 | 0.688 |
| 6.17 | 98.75% Formosa | 0.75% CF-40E | 0.5% HT6000 | | | 0.125 N$_2$ | 0.606 | 0.568 |
| 6.18 | 96.75% Formosa | 0.75% CF-40E | 2.5% HT6000 | | | 0.03 N$_2$ | 0.892 | 0.470 |
| 6.19 | 98% Formosa | 2.0% CF-40E | | | | 0.125 N$_2$ | 0.481 | 0.416 |

TABLE 1-continued

Comparison of different insulative cellular non-aromatic polymeric material formulations to create various multi-layer parison and insulative container densities

| Trial | Base Resin | Additive #1 | Additive #2 | Additive #3 | Additive #4 | Gas [lbs/hr] | Bottle Density [g/cm³] | Parison Density [g/cm³] |
|---|---|---|---|---|---|---|---|---|
| 6.20 | 97.5% Formosa | 2% CF-40E | 0.5% HT6000 | | | 0.03 N$_2$ | 0.846 | 0.478 |
| 6.21 | 95.5% Formosa | 2% CF-40E | 2.5% HT6000 | | | 0.1 N$_2$ | 0.597 | 0.411 |
| 6.22 | 98.75% Formosa | 0.75% CF-40E | 0.4% HT6000 | | | 0.125 N$_2$ | 0.573 | 0.414 |

EXAMPLE 7

Formulations and Test Results

FORMOSA PLASTICS® FORMOLENE® HB5502F HDPE hexene copolymer was used as the polyethylene base resin. To that polyethylene base resin, HYDROCEROL® CF 40E and Heritage Plastics HT6000 LLDPE talc as nucleating agents were added. In addition, N2 was added as a blowing agent. The percentages were about:

| | |
|---|---|
| 98.75% | FORMOLENE(T) HB5502F HDPE hexene copolymer |
| 0.75% | HYDROCEROL ® CF 40E |
| 0.3% | Heritage Plastics HT6000 LLDPE Based Talc Concentrate |

The HDPE and nucleating agents were added to an extruder hopper and blended to provide a formulation. The formulation was then heated in the extruder to form a molten material. A blowing agent was then added to the molten material at a rate of about:

| | |
|---|---|
| 0.12 | lbs/hr N2 |

The N2 was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers to form a multi-layer parison having a density of about 0.407 grams per cubic centimeter. The multi-layer parison was then blow molded to establish an insulative container having a density of about 0.577 grams per cubic centimeter.

EXAMPLE 8

Formulation and Extrusion

FORMOSA PLASTICS® FORMOLENE® HB5502F HDPE hexene copolymer and EQUISTAR® ALATHON® H5520 HDPE copolymer were used as polyethylene base resins. The polyethylene base resins were blended with HYDROCEROL® CF 40E as a nucleating agent and Heritage Plastics HT6000 LLDPE talc as another nucleating agent, and N2 as a blowing agent. Ampacet 102823 Process Aid PE MB LLDPE was added as a slip agent and COLORTECH® 11933-19 was added as a colorant. The percentages were about:

| | |
|---|---|
| 47.5% | FORMOLENE ® HB5502F HDPE hexene copolymer |
| 47.5% | EQUISTAR ® ALATHON ® H5520 HDPE copolymer |
| 0.5% | Heritage Plastics HT4HP Talc |
| 1.5% | HYDROCEROL ® CF 40E |
| 2.0% | Ampacet 102823 Process Aid PE MB LLDPE |
| 1.0% | COLORTECH ® 11933-19 Titanium Oxide Colorant |

The HDPE, nucleating agents, slip agents, and colorants were added to an extruder hopper and blended to provide a formulation. The formulation was then heated in the extruder to form a molten material. The blowing agent was then added to the molten material at a rate of about:

| | |
|---|---|
| 0.12 | lbs/hr N2 |

The N2 was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers to form a multi-layer parison having a density of about 0.396 grams per cubic centimeter. The multi-layer parison was then blow molded to establish an insulative container having a density of about 0.519 grams per cubic centimeter.

EXAMPLE 9

Formulations and Test Results

FORMOSA PLASTICS® FORMOLENE® HB5502F HDPE hexene copolymer and EQUISTAR® ALATHON® H5520 HDPE copolymer were used as polyethylene base resins. The polyethylene base resins were used in various percentages from about 23.875% to about 74.925% of the formulation. The polyethylene base resins were blended with HYDROCEROL® CF 40E as a nucleating agent and Heritage Plastics HT6000 LLDPE talc as another nucleating agent, and CO2 or N2 as a blowing agent. The blowing agent was used at levels between about 0.3 lbs/hr to about 1.25 lbs/hour. Ampacet 102823 Process Aid PE MB LLDPE was added as a slip agent and COLORTECH® 11933-19 was added as a colorant. In some examples, DOW® AFFINITY™ PL 1880G polyolefin elastomer was added as an impact modifier to the formulation. The various formulations and resulting multi-layer parison and insulative container densities are shown below in Table 2.

TABLE 2

Comparison of different insulative cellular non-aromatic polymeric material formulations to create various multi-layer parison and insulative container densities

| Trial | Base Resin #1 | Base Resin #2 | Additive #1 | Additive #2 | Additive #3 | Additive #4 | Gas [lbs/hr] | Bottle Density [g/cm$^3$] | Parison Density [g/cm$^3$] |
|---|---|---|---|---|---|---|---|---|---|
| 9.1 | 47.5% Formosa | 47.5% LBI | 1.5% CF-40E | 2% Ampacet | 1% Colortech | 0.5% HT4HP | 0.09 N$_2$ | 0.649 | 0.423 |
| 9.2 | 24.975% Formosa | 74.925% LBI 0.25MI | 0.1% CF-40E | | | | 0.03 N$_2$ | 0.906 | 0.771 |
| 9.3 | 24.6875% Formosa | 74.0625% LBI 0.25MI | 0.75% CF-40E | 0.5% HT6000 | | | 0.1 N$_2$ | 0.668 | 0.611 |
| 9.4 | 23.875% Formosa | 71.625% LBI 0.25MI | 2% CF-40E | 2.5% HT6000 | | | 0.125 N$_2$ | 0.851 | 0.720 |
| 9.5 | 49.7% Formosa | 49.7% LBI 0.25MI | 0.1% CF-40E | 0.5% HT6000 | | | 0.125 N$_2$ | 0.668 | 0.436 |
| 9.6 | 48.375% Formosa | 48.375% LBI 0.25MI | 0.75% CF-40E | 2.5% HT6000 | | | 0.03 N$_2$ | 0.903 | 0.711 |
| 9.7 | 49% Formosa | 49% LBI 0.25MI | 2% CF-40E | | | | 0.1 N$_2$ | 0.626 | 0.425 |
| 9.8 | 73.05% Formosa | 24.35% LBI 0.25MI | 0.1% CF-40E | 2.5% HT6000 | | | 0.1 N$_2$ | 0.751 | 0.495 |
| 9.9 | 74.4375% Formosa | 24.8125% LBI 0.25MI | 0.75% CF-40E | | | | 0.125 N$_2$ | 0.578 | 0.422 |
| 9.10 | 73.125% Formosa | 24.375% LBI 0.25MI | 2% CF-40E | 0.5% HT6000 | | | 0.03 N$_2$ | 0.858 | 0.566 |
| 9.11 | 42.25% Formosa | 42.25% LBI 0.25MI | 15% Dow Impact Mod | 0.1% CF-40E | 0.4% HT6000 | | 0.125 N$_2$ | 0.640 | 0.441 |
| 9.12 | 42.25% Formosa | 42.25% LBI 0.25MI | 15% Dow Impact Mod | 0.1% CF-40E | 0.4% HT6000 | | 0.1 N$_2$ | 0.742 | 0.502 |
| 9.13 | 42.25% Formosa | 42.25% LBI 0.25MI | 15% Dow Impact Mod | 0.1% CF-40E | 0.4% HT6000 | | 0.1 N$_2$ | 0.735 | 0.508 |
| 9.14 | 42.25% Formosa | 42.25% LBI 0.25MI | 15% Dow Impact Mod | 0.1% CF-40E | 0.4% HT6000 | | 0.1 N$_2$ | 0.766 | 0.512 |

EXAMPLE 10

Formulations and Test Results

FORMOSA PLASTICS® FORMOLENE® HB5502F HDPE hexene copolymer was used as polyethylene base resin. The polyethylene base resin was used in various percentages from about 97.95% to about 100% of the formulation. In some examples, the polyethylene base resin was blended with HYDROCEROL® CF 40E as a nucleating agent and Heritage Plastics HT6000 LLDPE talc as another nucleating agent, and N2 as a blowing agent. The blowing agent was used at levels between about 0.05 lbs/hr to about 0.15 lbs/hour. COLORTECH® 11933-19 was added as a colorant in some examples. The various formulations and resulting multi-layer parison and insulative container densities are shown below in Table 3.

TABLE 3

Comparison of different insulative cellular non-aromatic polymeric material formulations to create various multi-layer parison and insulative container densities

| Trial | Formosa 5502F | Colortech | CF-40E | HT6000 | N$_2$ [lbs/hr] | Bottle Density [g/cm$^3$] | Parison Density [g/cm$^3$] |
|---|---|---|---|---|---|---|---|
| 10.1 | 97.95% | 1% | 0.75% | 0.3% | 0.1222 | 0.7183 | * |
| 10.2 | 98% | 0% | 2% | 0% | 0.0529 | 0.6950 | * |
| 10.3 | 99.25% | 0% | 0.75% | 0% | 0.0534 | 0.7296 | * |
| 10.4 | 99% | 0% | 1.0% | 0% | 0.0511 | 0.7404 | 0.4292 |
| 10.5 | 98.7% | 0% | 1.0% | 0.3% | 0.0514 | 0.7316 | 0.4272 |
| 10.6 | 98.45% | 0% | 1.25% | 0.3% | 0.0521 | 0.7309 | 0.4276 |
| 10.7 | 98.75% | 0% | 1.25% | 0% | 0.0529 | 0.7303 | 0.4236 |

TABLE 3-continued

Comparison of different insulative cellular non-aromatic polymeric material formulations to create various multi-layer parison and insulative container densities

| Trial | Formosa 5502F | Colortech | CF-40E | HT6000 | $N_2$ [lbs/hr] | Bottle Density [g/cm$^3$] | Parison Density [g/cm$^3$] |
|---|---|---|---|---|---|---|---|
| 10.8 | 98.75% | 0% | 1.25% | 0% | 0.0522 | 0.7136 | 0.4234 |
| 10.9 | 98.75% | 0% | 1.25% | 0% | 0.0538 | 0.7214 | 0.4304 |
| 10.10 | 100% | 0% | 0% | 0% | 0.1468 | * | * |
| 10.11 | 100% | 0% | 0% | 0% | 0.1392 | * | * |
| 10.12 | 99.9% | 0% | 0% | 0.1% | 0.1393 | * | * |
| 10.13 | 99.5% | 0% | 0% | 0.5% | 0.0656 | * | * |
| 10.14 | 99.4% | 0% | 0.1% | 0.5% | 0.0702 | * | * |
| 10.15 | 99.3% | 0% | 0.2% | 0.5% | 0.0692 | * | * |
| 10.16 | 99.7% | 0% | 0.1% | 0.2% | 0.0673 | * | * |
| 10.17 | 99.7% | 0% | 0.1% | 0.2% | 0.0892 | * | * |
| 10.18 | 99.7% | 0% | 0.1% | 0.2% | 0.105 | * | * |
| 10.19 | 99.7% | 0% | 0.1% | 0.2% | 0.1188 | * | * |
| 10.20 | 99.7% | 0% | 0.1% | 0.2% | 0.0915 | * | * |
| 10.21 | 99.05% | 0% | 0.75% | 0.2% | 0.0906 | * | * |

* Data not available

EXAMPLE 11

Formulations and Test Results

Bottles were formed from 99.4 wt % FORMOSA PLASTICS® FORMOLENE® HB5502F HDPE hexene copolymer as the polyethylene base resin blended with 0.1 wt % HYDROCEROL® CF 40E as a nucleating agent and 0.5 wt % Heritage Plastics HT6000 LLDPE talc as another nucleating agent with 0.04 lbs/hr of $N_2$ blowing agent. The resulting bottles and parisons were a single layer (i.e., monolayer). The resulting monolayer parison and monolayer container densities are shown under the various process conditions.

TABLE 4

Comparison of process parameters on bottle and parison densities.

| Run [#] | Cycle [s] | Air [psi] | Vacuum | Parison ρ (g/cm$^3$) | Bottle ρ (g/cm$^3$) |
|---|---|---|---|---|---|
| 1 | 14 | 40 | Off | 0.546 | 0.748 |
| 2 | 14 | 40 | On | 0.570 | 0.795 |
| 3 | 14 | 60 | Off | 0.542 | 0.706 |
| 4 | 14 | 60 | On | 0.538 | 0.724 |
| 5 | 15 | 40 | Off | 0.553 | 0.792 |
| 6 | 15 | 40 | On | 0.559 | 0.789 |
| 7 | 15 | 60 | Off | 0.542 | 0.844 |
| 8 | 15 | 60 | On | 0.550 | 0.798 |
| 9 | 16 | 40 | Off | 0.536 | 0.649 |
| 10 | 16 | 40 | On | 0.549 | 0.788 |
| 11 | 16 | 60 | Off | 0.540 | 0.825 |
| 12 | 16 | 60 | On | 0.555 | 0.840 |
| 13 | 17 | 40 | Off | 0.548 | 0.791 |
| 14 | 17 | 40 | On | 0.544 | 0.789 |
| 15 | 17 | 60 | Off | 0.543 | 0.716 |
| 16 | 17 | 60 | On | 0.548 | 0.707 |
| 17 | 18 | 40 | Off | 0.546 | 0.806 |
| 18 | 18 | 40 | On | 0.540 | 0.792 |
| 19 | 18 | 60 | Off | 0.533 | 0.833 |
| 20 | 18 | 60 | On | 0.547 | 0.829 |

EXAMPLE 12

Formulations and Test Results

FORMOSA PLASTICS® FORMOLENE® HB5502F HDPE hexene copolymer was used as polyethylene base resin. The polyethylene base resin was used in 99.4 wt % of the formulation. The polyethylene base was either 100% virgin HDPE (i.e., the control) or a combination of virgin HDPE and regrind. The regrind was a foam bottle produced according to Example 11, ground up, and then put back into the system. The polyethylene base resin was blended with 0.1 wt % HYDROCEROL® CF 40E as a nucleating agent and 0.5 wt % Heritage Plastics HT6000 LLDPE talc as another nucleating agent, and N2 as a blowing agent. The blowing agent was used at about 0.04 lbs/hr. The various formulations and resulting monolayer parison and insulative container densities are shown below in Table 5.

TABLE 5

Comparison of percent virgin and percent regrind on bottle and parison densities.

| Run [#] | Virgin | Regrind | Cycle Time | Parison ρ (g/cm$^3$) | Bottle ρ (g/cm$^3$) |
|---|---|---|---|---|---|
| Control | 100% | 0% | 15 | 0.617 | 0.757 |
| 1 | 80% | 20% | 14 | 0.524 | 0.769 |
| 2 | 80% | 20% | 15 | 0.493 | 0.728 |
| 3 | 80% | 20% | 16 | 0.499 | 0.747 |
| 4 | 60% | 40% | 14 | 0.519 | 0.747 |
| 5 | 60% | 40% | 15 | 0.531 | 0.751 |
| 6 | 60% | 40% | 16 | 0.523 | 0.742 |
| 7 | 40% | 60% | 14 | 0.493 | 0.718 |
| 8 | 40% | 60% | 15 | 0.435 | 0.697 |
| 9 | 40% | 60% | 16 | 0.444 | 0.682 |
| 10 | 20% | 80% | 14 | 0.442 | 0.690 |
| 11 | 20% | 80% | 15 | 0.483 | 0.726 |
| 12 | 20% | 80% | 16 | 0.493 | 0.728 |

The bottles produced with regrind as part of the base polyethylene maintained densities of about 80%.

In another set of bottles produced as described immediately above except that the regrind was a 2nd pass regrind.

TABLE 6

Comparison of percent virgin and percent 2nd pass regrind on bottle and parison densities.

| Run [#] | Virgin | Regrind | Cycle Time | Parison ρ (g/cm³) | Bottle ρ (g/cm³) |
|---|---|---|---|---|---|
| 1 | 80% | 20% | 14 | 0.536 | 0.773 |
| 2 | 80% | 20% | 15 | 0.502 | 0.764 |
| 3 | 80% | 20% | 16 | 0.496 | 0.778 |

Even with 2nd pass regrind, bottle characteristics were very similar to the characteristics of bottles produced with virgin HDPE.

EXAMPLE 13

Effect of RPM on Bottle Formation

FORMOSA PLASTICS® FORMOLENE® HB5502F HDPE hexene copolymer was used as polyethylene base resin, at about 99.4%. The polyethylene base resin was blended with 0.1% HYDROCEROL® CF 40E as a nucleating agent and Heritage Plastics HT6000 LLDPE talc as another nucleating agent, and N2 as a blowing agent. The blowing agent was used at about 0.04 lbs/hr. This formulation was processed at various RPMs to produce bottles. Thus, the only variable in the bottle formation of these different runs was the RPMs of the throughput system.

TABLE 7

Effect of RPMs on Drop Test results.

| Run [#] | RPM | Parison ρ (g/cm3) | Bottle ρ (g/cm3) | Weight (g) | Thickness | Top Load | Drop Test [Pass] |
|---|---|---|---|---|---|---|---|
| 5 | 48 | 0.711 | 0.892 | 54.5 | 41.2 | 87.562 | 100% |
| 1 | 36 | 0.660 | 0.842 | 50.2 | 37.7 | 92.696 | 100% |
| 1A | 36 | 0.638 | 0.780 | 51.5 | 43.6 | 89.578 | 100% |
| 2 | 27 | 0.577 | 0.817 | 53.4 | 42.1 | 105.806 | 100% |
| 3 | 18 | 0.495 | 0.756 | 45.0 | 37.0 | 73.94 | 20% |
| 4 | 11 | 0.396 | 0.601 | 32.0 | 30.7 | 36.764 | 0% |

Changing the RPM in the throughput system produced changes to bottle and parison characteristics. For example, higher RPMs produced a higher density parison and higher density bottle. Thereby, using a lower RPM in the throughput system produced lower density bottles. Although these systems utilized a single drop, this shows that a multi-parison drop system is possible. For example, a throughput system can start at a particular RPM (e.g., 48 RPM) for the extrusion stream and then and then split into multiple parison streams at lower RPMs. In an illustrative example, one extrusion stream can start at 48 RPM and split into 4 parison drop streams running at 12 RPM. This would produce a more efficient foaming system to produce bottles.

EXAMPLE 14

Density Measurements

This Example demonstrates the test used to measure the density of filled and unfilled polymer parts.

Procedure

The density was determined by the apparatus shown, unassembled, in FIG. 2. Although not shown in FIG. 2, the apparatus also included a thermometer to measure the suspension liquid temperature. A suspension liquid is a fluid with a density lower than that of the sample to be measured. The sample must sink in the suspension fluid to determine the sample density. Water has a density of 1 g/cm3, so most unfilled polymers require some other suspension fluid such as isopropyl alcohol, density=0.8808 g/cm3. A Mettler AT400 balance (Mettler-Toledo LLC, Columbus, Ohio) was also used.

The density of a limestone-filled HDPE bottle was measured. After taring the balance to zero, the dry solid sample was weighed after placing it in the cup of the Mettler balance. The dry weight was 0.3833 g. After weighing the dry sample and before removing the sample from the cup, the balance was tared again. The sample was removed from the cup and placed on the gem holder in the suspension fluid. The sample was weighed providing the weight with a negative number (−0.3287 g). The number was converted to its absolute value (0.3287 g); the positive value is the sample buoyancy. The sample density was calculated by multiplying the dry weight (0.3833 g) by the sample buoyancy (0.3287 g) by the suspension fluid density (0.8808 g/cc), which equaled 1.0272 g/cc.

EXAMPLE 15

Formulations and Test Results

Marlex® HHM 5502BN HDPE hexene copolymer (Chevron Phillips Chemical Company, The Woodlands, Tex.) was used as polyethylene base resin in the core layer. The polyethylene base resin was used in various percentages from about 98% to about 100% of the formulation. In some examples, the polyethylene base resin was blended with HYDROCEROL® CF 40E as a chemical blowing agent in all non-control samples and Heritage Plastics HT4HP talc as another nucleating agent, and N2 as a blowing agent. The blowing agent was used at about 11 kg/hr. The various formulations and resulting multi-layer parison and insulative container densities are shown below in Table 3.

The extruded material was a multi-layer material where the core layer was sandwiched between an outer and inner polymeric layer. The outer and inner layer were comprised of various amounts of Marlex® HHM 5502BN HDPE hexene copolymer (Chevron Phillips). The outer polymeric layer also included 5 wt % colorant (COLORTECH® 11933-19 titanium oxide). The inner polymeric layer did not include a colorant. Some embodiments of the formulations included inner and/or outer polymeric layers comprising a reinforcing fiber (Hyperform® HPR-803i, Milliken & Co., Spartanburg, S.C.).

TABLE 8

Comparison of different insulative cellular non-aromatic polymeric material formulations to create various multi-layer parison and insulative container densities

| Sample | Core Layer | | | Outer Layer | | | Inner Layer | |
|---|---|---|---|---|---|---|---|---|
|  | HDPE | CBA | Talc | HDPE | Color | Fiber | HDPE | Fiber |
| Control | 100% | 0% | 0% | 95% | 5% | 0% | 100% | 0% |
| 1-1 | 100% | 0.10% | 0.30% | 95% | 5% | 0% | 100% | 0% |
| 1-2 | 100% | 0.10% | 0.30% | 95% | 5% | 0% | 100% | 0% |
| 1-3 | 100% | 0.10% | 0.30% | 95% | 5% | 0% | 100% | 0% |
| 1-4 | 98.4% | 0.10% | 1.50% | 95% | 5% | 0% | 100% | 0% |
| 1-5 | 98.4% | 0.10% | 1.50% | 95% | 5% | 0% | 100% | 0% |
| 1-6 | 98.4% | 0.10% | 1.50% | 95% | 5% | 0% | 100% | 0% |
| 1-7 | 99.2% | 0.50% | 0.30% | 95% | 5% | 0% | 100% | 0% |
| 1-8 | 99.2% | 0.50% | 0.30% | 95% | 5% | 0% | 100% | 0% |
| 1-9 | 99.2% | 0.50% | 0.30% | 95% | 5% | 0% | 100% | 0% |
| 1-10 | 98.0% | 0.50% | 1.50% | 95% | 5% | 0% | 100% | 0% |
| 1-10A | 98.0% | 0.50% | 1.50% | 80% | 5% | 15% | 85% | 15% |
| 1-11 | 98.0% | 0.50% | 1.50% | 95% | 5% | 0% | 100% | 0% |
| 1-12 | 98.0% | 0.50% | 1.50% | 95% | 5% | 0% | 100% | 0% |
| 1-13 | 99.6% | 0.10% | 0.30% | 85% | 5% | 10% | 100% | 0% |
| 1-14 | 99.6% | 0.10% | 0.30% | 80% | 5% | 15% | 100% | 0% |
| 1-15 | 99.6% | 0.10% | 0.30% | 75% | 5% | 20% | 100% | 0% |

TABLE 9

Effect of formulation on Physical Characteristics, Bottle and Parison Density, and Performance

| Sample | Bottle ρ (g/cm³) | Parison ρ (g/cm³) | Weight (g) | Density (g/cm³) | Water Drop (% passed test) |
|---|---|---|---|---|---|
| Control |  |  | 23.0 | 0.934 | 100% |
| 1-1 | 0.58 | 0.46 | 17.1 | 0.710 | 70% |
| 1-2 | 0.655 | 0.46 | 16.9 | 0.734 | 80% |
| 1-3 | 0.79 | 0.46 | 17.1 | 0.760 | 70% |
| 1-4 | 0.58 | 0.45 | 17.7 | 0.644 | 90% |
| 1-5 | 0.70 | 0.45 | 17.2 | 0.685 | 100% |
| 1-6 | 0.80 | 0.45 | 16.8 | 0.744 | 80% |
| 1-7 | 0.60 | 0.5 | 17.4 | 0.612 | 60% |
| 1-8 | 0.69 | 0.5 | 17.3 | 0.697 | 100% |
| 1-9 | 0.74 | 0.5 | 17.1 | 0.760 | 100% |
| 1-10 | 0.61 |  | 17.0 | 0.625 | 100% |
| 1-10A | 0.47 |  | 17.0 | 0.479 | 60% |
| 1-11 | 0.67 |  | 17.1 | 0.693 | 100% |
| 1-12 | 0.82 |  | 17.5 | 0.784 | 100% |
| 1-13 | 0.61 |  | 17.0 | 0.624 | 100% |
| 1-14 | 0.67 |  | 17.5 | 0.656 | 90% |
| 1-15 | 0.62 |  | 17.1 | 0.665 | 90% |

The invention claimed is:

1. A non-aromatic formulation for a container comprising
at least one high density polyethylene (HDPE) resin which is about 50 wt % to about 99.9 wt % of the formulation,
a chemical blowing agent which is up to about 2 wt % of the formulation, and
a nucleating agent which is up to about 15 wt % of the formulation,
wherein the formulation further comprises regrind from containers previously made of the formulation described above.

2. The non-aromatic formulation of claim 1, wherein the container has a container density of about 0.4 g/cm³ to about 0.9 g/cm³.

3. The non-aromatic formulation of claim 2, wherein the formulation has a formulation density of about 0.4 g/cm³ to about 0.9 g/cm³.

4. The non-aromatic formulation of claim 3, wherein a ratio of the container density to the formulation density is about 1.0 to about 2.3.

5. The non-aromatic formulation of claim 3, wherein the container density is greater than the formulation density.

6. The non-aromatic formulation of claim 5, further comprising a physical blowing agent.

7. The non-aromatic formulation of claim 6, wherein the regrind is about 10 wt % to about 50 wt % of the formulation.

8. The non-aromatic formulation of claim 7, further comprising a colorant which is up to about 4 wt % of the formulation.

9. The non-aromatic formulation of claim 1, wherein the formulation has a formulation density of about 0.4 g/cm³ to about 0.9 g/cm³.

10. The non-aromatic formulation of claim 9, wherein a container density is greater than the formulation density.

11. The non-aromatic formulation of claim 10, wherein at least one high density polyethylene (HDPE) resin is a HDPE homopolymer.

12. The non-aromatic formulation of claim 10, wherein the at least one high density polyethylene (HDPE) resin is a HDPE copolymer.

13. The non-aromatic formulation of claim 10, wherein the at least one high density polyethylene (HDPE) resin is about 10% to about 100% virgin HDPE.

14. The non-aromatic formulation of claim 13, wherein the chemical blowing agent is about 0.1 wt % to about 2 wt % of the formulation.

15. The non-aromatic formulation of claim 14, wherein the nucleating agent is about 0.5 wt % to about 5 wt % of the formulation.

16. The non-aromatic formulation of claim 15, wherein the nucleating agent is selected from the group consisting of talc, $CaCO_3$, mica, and mixtures of at least two of the foregoing.

17. The non-aromatic formulation of claim 6, wherein the physical blowing agent is selected from the group consisting of $N_2$, $CO_2$, helium, argon, air, and mixtures thereof.

18. The non-aromatic formulation of claim 1, wherein a ratio of a container density to a formulation density is about 1.0 to about 2.3.

19. The non-aromatic formulation of claim 1, wherein a container density is greater than a formulation density.

20. The non-aromatic formulation of claim 1, wherein a ratio of a container weight to container density is in a range of about 21 to 26 and density is expressed in grams/cm$^3$ and container weight is expressed in grams.

* * * * *